United States Patent
Fisher et al.

(10) Patent No.: US 9,125,778 B2
(45) Date of Patent: Sep. 8, 2015

(54) REGENERATIVE BRAKING SYSTEM FOR A VEHICLE RAMP

(75) Inventors: Steve Fisher, Rosamund, CA (US); Lluno Cervera, Panorama City, CA (US); Christopher Wyszkowski, Simi Valley, CA (US)

(73) Assignee: Ricon Corp., Panorama City, CA (US)

(*) Notice: Subject to any disclaimer, the term of this patent is extended or adjusted under 35 U.S.C. 154(b) by 0 days.

(21) Appl. No.: 14/238,940

(22) PCT Filed: Sep. 14, 2012

(86) PCT No.: PCT/US2012/055320
§ 371 (c)(1),
(2), (4) Date: Oct. 1, 2014

(87) PCT Pub. No.: WO2013/040301
PCT Pub. Date: Mar. 21, 2013

(65) Prior Publication Data
US 2015/0013082 A1    Jan. 15, 2015

Related U.S. Application Data

(60) Provisional application No. 61/534,732, filed on Sep. 14, 2011.

(51) Int. Cl.
*A61G 3/06* (2006.01)
*B60P 1/43* (2006.01)

(52) U.S. Cl.
CPC . *A61G 3/061* (2013.01); *B60P 1/43* (2013.01); *B60P 1/438* (2013.01)

(58) Field of Classification Search
CPC ......... A61G 3/061; B60P 1/433; B60P 1/431; B60P 1/438; B60R 3/02; E01D 19/00; B65G 69/2841; B65G 69/2823; B65G 69/2811
See application file for complete search history.

(56) References Cited

U.S. PATENT DOCUMENTS

| | | | |
|---|---|---|---|
| 4,503,722 A | 3/1985 | Suzuki et al. |
| 4,789,207 A | 12/1988 | Wupper |
| 5,111,912 A | 5/1992 | Kempf |
| 5,228,538 A | 7/1993 | Tremblay |
| 5,253,973 A | 10/1993 | Fretwell |
| 5,373,915 A | 12/1994 | Tremblay |
| 5,556,250 A | 9/1996 | Fretwell et al. |
| 5,669,587 A | 9/1997 | Van Alstine et al. |
| 5,676,515 A | 10/1997 | Haustein |
| 6,698,998 B2 | 3/2004 | Koretsky |
| 6,802,095 B1 | 10/2004 | Whitmarsh et al. |

(Continued)

FOREIGN PATENT DOCUMENTS

WO    2009134975 A1    11/2009

*Primary Examiner* — Abigail A Risic
(74) *Attorney, Agent, or Firm* — The Webb Law Firm

(57) ABSTRACT

A ramp assembly includes a ramp movable between a deployed position, a stowed position, and an intermediate position and a drive mechanism comprising a motor configured to move the ramp between the deployed position and the stowed position. The motor has a shunted mode and a non-shunted mode. The assembly further includes a first detecting arrangement configured to detect a position of the ramp and a second detecting arrangement configured to detect a direction of movement of the ramp, with the motor being placed in one of the shunted mode and the non-shunted mode based on the position and the direction of movement of the ramp.

18 Claims, 3 Drawing Sheets

(56) References Cited

U.S. PATENT DOCUMENTS

| | | | |
|---|---|---|---|
| 6,971,967 B2 | 12/2005 | Whitmarsh | |
| 7,001,132 B2 | 2/2006 | Koretsky et al. | |
| 7,290,975 B2 | 11/2007 | Richard et al. | |
| 7,349,796 B2 | 3/2008 | Toyama et al. | |
| 7,370,720 B2 | 5/2008 | Kokatsu et al. | |
| 7,533,432 B2 | 5/2009 | Morris et al. | |
| 7,533,433 B2 | 5/2009 | Morris et al. | |
| 7,533,434 B2 | 5/2009 | Morris et al. | |
| 7,681,272 B2 | 3/2010 | Morris et al. | |
| 7,870,630 B2 * | 1/2011 | Johnson | 14/71.1 |
| 7,870,631 B2 | 1/2011 | Morris et al. | |
| 7,913,341 B1 | 3/2011 | Morris et al. | |
| 7,913,343 B1 * | 3/2011 | Cohn | 14/71.3 |
| 7,928,738 B2 | 4/2011 | Sip | |
| 8,032,963 B2 | 10/2011 | Morris et al. | |
| 8,122,552 B2 | 2/2012 | Morris et al. | |
| 8,122,553 B1 | 2/2012 | Johnson et al. | |
| 8,132,281 B1 | 3/2012 | Johnson et al. | |
| 8,166,594 B1 | 5/2012 | Morris | |
| 8,181,300 B1 | 5/2012 | Johnson et al. | |
| 8,230,539 B2 | 7/2012 | Morris et al. | |
| 8,234,737 B2 | 8/2012 | Morris et al. | |
| 8,250,693 B1 | 8/2012 | Johnson et al. | |
| 8,327,485 B1 | 12/2012 | Morris et al. | |
| 8,359,691 B2 | 1/2013 | Morris et al. | |
| 8,375,496 B1 | 2/2013 | Johnson et al. | |
| 8,533,884 B1 * | 9/2013 | Johnson et al. | 14/71.3 |
| 8,782,840 B2 | 7/2014 | Saucier et al. | |
| 2006/0245883 A1 | 11/2006 | Fontaine et al. | |
| 2008/0271266 A1 | 11/2008 | Johnson | |
| 2011/0088177 A1 * | 4/2011 | Johnson et al. | 14/69.5 |
| 2014/0248109 A1 * | 9/2014 | Johnson et al. | 414/537 |

* cited by examiner

REGENERATIVE BRAKING SYSTEM FOR A VEHICLE RAMP

BACKGROUND OF THE INVENTION

1. Field of the Invention

One embodiment of the present invention relates to a vehicle access ramp and, more particularly, to a braking system for a vehicle access ramp or lift.

2. Description of Related Art

Ramp assemblies are normally stowed in a generally horizontal position in a recess in a vehicle floor and can be pivoted upward and outward to a downward-sloping deployed position after the vehicle door has been opened, as shown, for example, in U.S. Pat. No. 6,179,545 titled "Flip-Over Ramp". The ramp assembly includes a mounting enclosure and a ramp, which are pivotally connected at their adjacent edges, which provides a horizontal axis for movement of the ramp between deployed and stowed positions.

In the typical application, the ramp is located in the front door of the vehicle, with a deployment path perpendicular to the length of the vehicle. In the fully stowed position, the ramp is essentially coplanar with the vehicle floor. In the deployed position, the ramp has moved through the front doorway to create a sloped surface between the sidewalk and the vehicle floor. The ramp assembly typically has a powered mode where the ramp is driven by a drive mechanism, and a manual mode where a user can move the ramp between the stowed position and the deployed position, and vice versa. Certain ramp assemblies also provide a damping mechanism to prevent free fall of the ramp when the ramp is positioned between the fully deployed and fully stowed position.

SUMMARY OF THE INVENTION

In one embodiment, a ramp assembly includes a ramp movable between a deployed position, a stowed position, and an intermediate position, and a drive mechanism comprising a motor configured to move the ramp between the deployed position and the stowed position. The motor has a shunted mode and a non-shunted mode. The assembly further includes a first detecting arrangement configured to detect a position of the ramp, and a second detecting arrangement configured to detect a direction of movement of the ramp, with the motor being placed in one of the shunted mode and the non-shunted mode based on the position and the direction of movement of the ramp.

The motor may generate torque opposite to the direction of movement of the ramp when in the shunted mode. The motor may be in the shunted mode when the ramp is moving from the intermediate position to the deployed position and when the ramp is moving from the intermediate position to the stowed position to control the rate of descent of the ramp. The motor may be in the non-shunted mode when the ramp is moving from the deployed position to the intermediate position and when the ramp is moving from the stowed position to the intermediate position. The drive mechanism may further include a drive shaft operatively connected to the motor and a drive member operatively connected to the drive shaft. A cam may be secured to the drive member, with the first detecting arrangement configured to detect the cam when the ramp has a predetermined position to determine the position of the ramp. A direction member may be secured to the drive shaft, with the second detecting arrangement configured to engage the direction member when the ramp is moving in a predetermined direction to detect the direction of movement of the ramp. A portion of the direction member may be positioned between at least one bumper, with the direction member configured to rotate with the drive shaft and slip relative to the drive shaft when the direction member is engaged with the at least one bumper. The first and second detecting arrangements may be electromechanical switches. The drive mechanism may further include a first sprocket and a second sprocket, with the first sprocket spaced from the second sprocket and the drive member positioned circumferentially around the first and second sprockets. The drive shaft may be secured to the second sprocket.

The drive member may be a flexible member forming a closed loop. The first and second detecting arrangements may be operatively connected with the motor to define a circuit. The first and second detecting arrangements may each have an open position and a closed position, based on the position of the ramp and the direction of the movement of the ramp, with the circuit configured to be closed when the first and second detecting arrangements are in the closed position to place the motor in the shunted mode. The first and second detecting arrangements may each be in the closed position when the ramp is moving from the intermediate position to the deployed position and when the ramp is moving from the intermediate position to the stowed position to control the rate of descent of the ramp.

In a further embodiment, a method of controlling a ramp assembly having a ramp and a drive mechanism having a motor is provided. The ramp has a deployed position, a stowed position, and an intermediate position. The method includes shunting the motor when the ramp is rotating from the intermediate position to the deployed position and when the ramp is rotating from the intermediate position to the stowed position. The shunting of the motor controls a rate of descent of the ramp.

The method may further include placing the motor in a non-shunted mode when the ramp is moving from the deployed position to the intermediate position and when the ramp is moving from the stowed position to the intermediate position. The motor may be shunted by selectively opening or closing a circuit using a first detecting arrangement configured to detect a position of the ramp and a second detecting arrangement configured to detect a direction of movement of the ramp.

DESCRIPTION OF THE INVENTION

Figure 1:
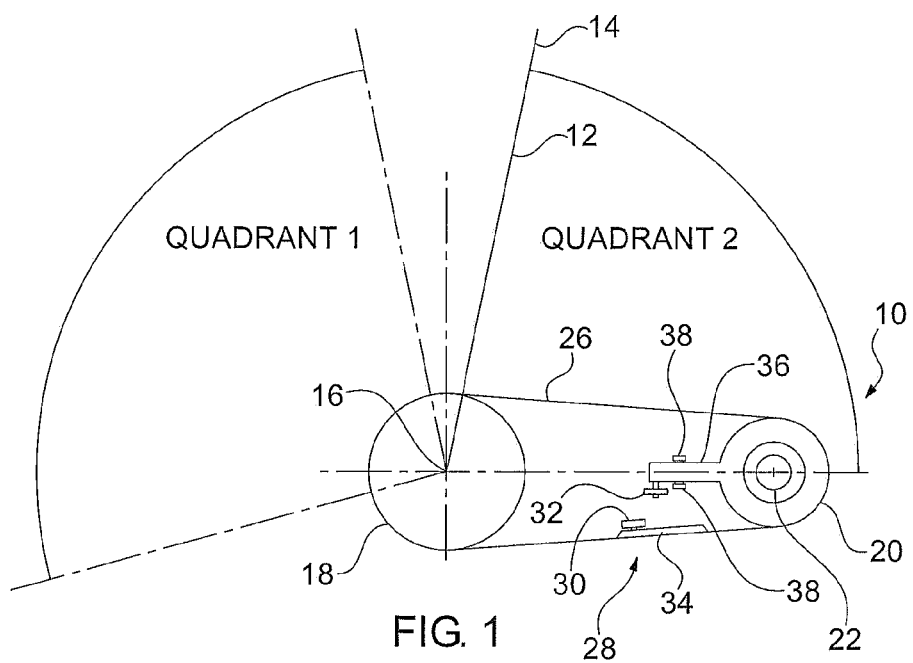
FIG. 1 is right side view of a ramp assembly according to one embodiment of the present invention.

For purposes of the description hereinafter, spatial orientation terms, if used, shall relate to the referenced embodiment as it is oriented in the accompanying drawing figures or otherwise described in the following detailed description.

However, it is to be understood that the embodiments described hereinafter may assume many alternative variations and embodiments. It is also to be understood that the specific devices illustrated in the accompanying drawing figures and described herein are simply exemplary and should not be considered as limiting.

Referring to FIGS. 1-6, one embodiment of a ramp assembly 10 for a vehicle includes a frame (not shown) and a ramp 12 having a first end 14 and a second end 16 secured to the frame and movable between a deployed position, where the first end 14 of the ramp 12 extends from the vehicle and is positioned adjacent to a ground surface and a stowed position where the ramp 12 is stowed within a vehicle (not shown) or a ramp enclosure (not shown). The ramp 12 may be secured to the frame or ramp enclosure via a pivotable linkage assembly (not shown). The ramp assembly 10 further includes a first sprocket 18 connected to the second end 16 of the ramp 12, a second sprocket 20 secured to a drive shaft 22, a motor 24 operatively connected to the drive shaft 22, and a flexible drive member 26, such as a drive chain, engaged with and positioned circumferentially around the first and second sprockets 18, 20. The first sprocket 18 may be secured to the ramp enclosure or frame while still be rotatable relative to the ramp enclosure or frame. Driving the motor 24 will cause a rotation of the drive shaft 22, which is transmitted to the second sprocket 20. Rotation and torque from the second sprocket 20 is transmitted to the first sprocket 18 via the drive member 26, which allows the ramp 12 to be rotated or moved between the fully stowed and fully deployed positions, and vice versa. The ramp assembly 10 may further include a controller (not shown) connected to the motor 24 and configured to control the operation of the motor 24 during powered operation of the ramp between the stowed and deployed positions. FIGS. 1-6, which are described in more detail below, presume the ramp assembly 10 is in a manual operation mode, i.e., where movement of the ramp 12 is not powered by the motor 24.

Figure 6:
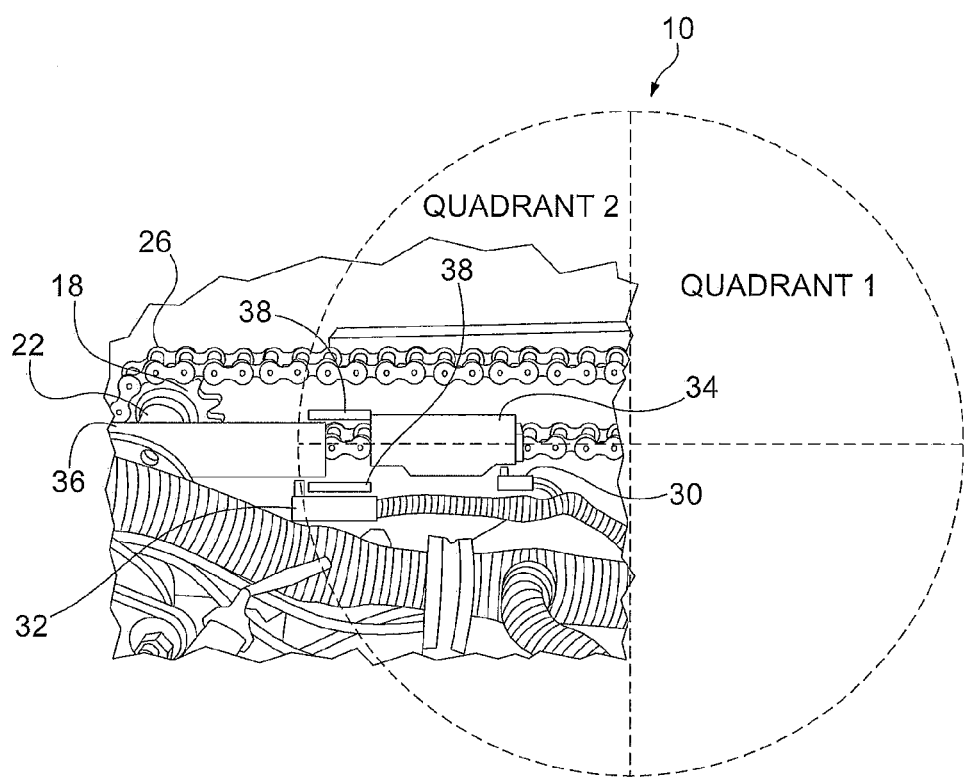
FIG. 6 is a partial left side perspective view of the ramp assembly of FIG. 1.

Referring to FIGS. 1 and 6, the ramp assembly 10 further includes a regenerative braking system 28 having a first switch 30 configured to detect a position of the ramp 12 relative to the vehicle and a second switch 32 configured to detect a direction of movement of the ramp 12 relative to the vehicle. In particular, the ramp 12 shown in FIG. 1 has a counterclockwise movement (from the stowed position to the deployed position) and a clockwise movement (from the deployed position to the stowed position). The first switch 30 and the second switch 32 are operatively connected to the motor 24 and are configured to shunt the motor 24 or place the motor 24 in a shunted mode, depending on the position and direction of movement of the ramp 12. The first switch 30 and the second switch 32 may be electromechanical switches that are electrically connected in series with the motor 24 to form a braking circuit 40, although other suitable switches and connections with the motor 24 may also be utilized. For instance, a solid state switch arrangement may also be provided. In other words, the position or mode of the first and second switches 30, 32 will determine whether the motor 24 is shunted by opening or closing the circuit 40. In particular, rotation of the motor 24 generates an electromagnetic force (EMF). If the motor 24 is shunted, the EMF produces torque that can oppose rotation to prevent "free fall" of the ramp 12 during manual operation. In other words, when the windings of the motor 24 are shunted, a torque is generated that is opposite to the direction of rotation. Thus, the motor 24 in the shunted mode can be utilized to control the rate of descent of the ramp 12. The motor 24 also has a non-shunted mode such that the force needed to counteract gravity during deployment or stowage of the ramp is not increased.

Referring again to FIGS. 1 and 6, the first switch 30 is fixed to the frame or ramp enclosure and is activated by a cam 34 secured to the drive member 26. The cam 34 will move with the drive member 26 and engage the first switch 30, thereby moving the first switch 30 between an open and closed position. The open and closed position of the first switch 30 corresponds to the position of the ramp. The second switch 32 is fixed to the frame or ramp enclosure and is activated by a direction member or bar 36 installed on the drive shaft 22. The bar 36 extends between a pair of bumpers 38 and is secured to the drive shaft 22 to allow slippage or relative movement between the bar 36 and the drive shaft 22 when the bar 36 engages one of the two bumpers 38. The bar 36 may be secured to the drive shaft 22 via a friction fit such that the bar 36 will rotate with the drive shaft 22 until a predetermined amount of force is applied to the bar 36, which causes the bar 36 to rotate relative to the drive shaft 22. In other words, the bar 36 will rotate between the bumpers 38 depending on the direction of rotation of the drive shaft 22, which corresponds to the direction of rotation of the ramp 12. The pair of bumpers 38 may be positioned above and below the bar 36. The second switch 32 is positioned such that movement in a particular direction will move the second switch 32 to a closed position and movement in an opposite direction will move the second switch 32 to an open position. For example, when the ramp 12 is moving in a clockwise direction, the bar 36 engages the upper bumper 38 and opens the second switch 32 to detect the direction of clockwise direction of the ramp 12. When the ramp 12 is moving in a counterclockwise direction, the bar 36 engages the lower bumper 38 and closes the second switch 32 to detect the counterclockwise direction of the ramp 12.

Referring to FIG. 1, the first switch 30 is configured to determine whether the ramp is in a first quadrant or a second quadrant. The first quadrant corresponds to a region between the fully deployed position and an intermediate position between the fully deployed position and the fully stowed position. The second quadrant corresponds to a region between the fully stowed position and the intermediate position. A "dead" angle exists between the first and second quadrants.

Figure 2:
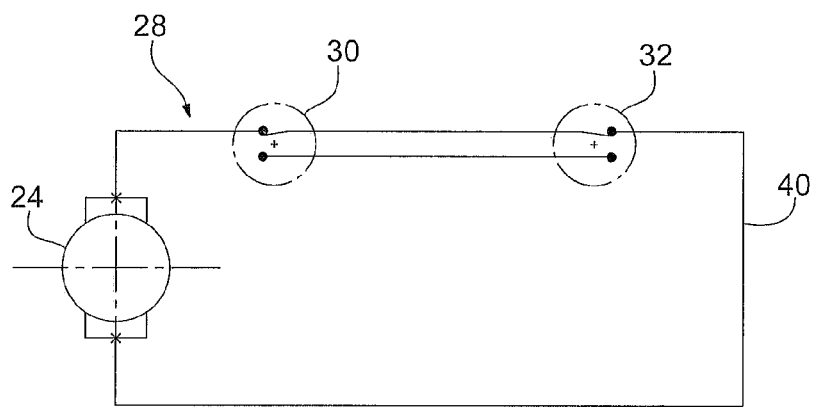
FIG. 2 is schematic view of the ramp assembly of FIG. 1, where the ramp is in a first quadrant and rotating counter-clockwise.

Referring to FIG. 2, a schematic of the operation of the regenerative braking system 28 shows a closed position of the first switch 30 and a closed position of the second switch 32 when the ramp is in the first quadrant and the ramp is rotating counterclockwise. In such a position and direction of movement, the controller places the motor 24 in the shunted mode, thereby producing a torque that opposes the rotation and "free fall" of the ramp to provide a controlled descent of the ramp.

Figure 3:
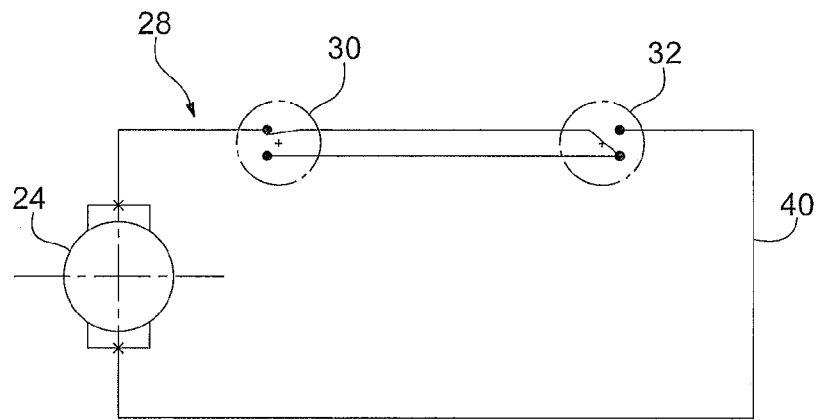
FIG. 3 is a schematic view of the ramp assembly of FIG. 1, where the ramp is in a first quadrant and rotating clockwise.

Referring to FIG. 3, a schematic of the operation of the regenerative braking system 28 shows a closed position of the first switch 30 and an open position of the second switch 32 when the ramp is in the first quadrant and the ramp is rotating clockwise. In such a position and direction of movement, the motor 24 is deactivated to allow the ramp to be lifted and not increasing the force needed to counteract gravity.

Figure 4:
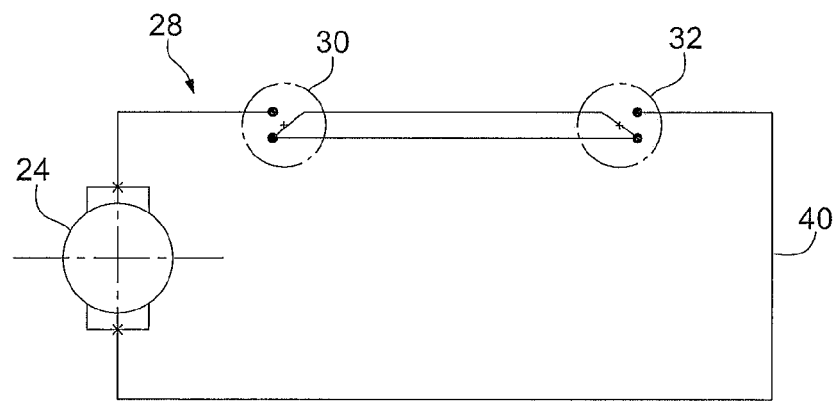
FIG. 4 is a schematic view of the ramp assembly of FIG. 1, where the ramp is in a second quadrant and rotating clockwise.

Referring to FIG. 4, a schematic of the operation of the regenerative braking system 28 shows an open position of the first switch 30 and an open position of the second switch 32 when the ramp is in the second quadrant and the ramp is rotating clockwise. In such a position and direction of movement, the controller places the motor 24 in the shunted mode, thereby producing a torque that opposes the rotation and "free fall" of the ramp to provide a controlled descent of the ramp.

Figure 5:
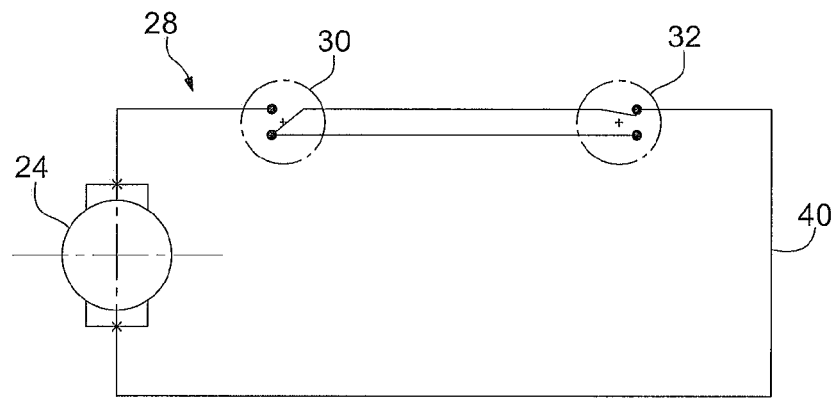
FIG. 5 is a schematic view of the ramp assembly of FIG. 1, where the ramp is in a second quadrant and rotating counter-clockwise.

Referring to FIG. 5, a schematic of the operation of the regenerative braking system 28 shows an open position of the first switch 30 and a closed position of the second switch 32 when the ramp is in the second quadrant and the ramp is rotating counterclockwise. In such a position and direction of movement, the motor 24 is deactivated to allow the ramp to be lifted and not increasing the force needed to counteract gravity. Table 1, provided below, shows the position of the first and second switches, and whether the motor is placed in the shunted mode or the non-shunted mode by the controller (value 1 corresponds to the closed position and value 2 corresponds to the open position).

TABLE 1

| | Ramp Position | | | |
| --- | --- | --- | --- | --- |
| | Quadrant 1 | | Quadrant 2 | |
| Rotation | CW | CCW | CW | CCW |
| Switch 1 | 1 | 1 | 2 | 2 |
| Switch 2 | 2 | 1 | 2 | 1 |
| Motor Shunt | NO | YES | YES | NO |

Accordingly, the switches 30, 32 continuously detect the position and direction of movement of the ramp 12, with the motor 24 selectively placed in the shunted mode or non-shunted mode to provide braking of the ramp 12 and controlling the rate of descent. The regenerative braking system 28, however, also allows the ramp 12 to be lifted without increasing the force needed to counteract gravity. In particular, the motor 24 has a shunted mode when the ramp 12 is rotating from the intermediate position to the fully deployed position and when the ramp 12 is rotating from the intermediate position to the fully stowed position to control the rate of descent. The motor 24 has a non-shunted mode when the ramp 12 is rotating from the fully deployed position to the intermediate position and when the ramp 12 is rotating from the fully stowed position to the intermediate position such that the force required to lift the ramp 12 is not increased. The motor 24 can be used to brake the descent of the ramp 12 without an external electric power source to counteract gravitational forces. In certain embodiments, the ramp assembly 10 can control non-powered rotational speed of the ramp 12 under gravitational force without interfering with manual or automatic operations. The ramp assembly 10 may allow for automatic brake release when manually lifting from the fully deployed or fully stowed positions. Although various applications or ramp arrangements may utilize the regenerative braking system 28, the embodiments described above are shown in connection with a control system for a 6:1 ramp where manual operation includes two modes: deploying and stowing.

Although the first switch 30 and the cam 34 arrangement and the second switch 32 and the bar 36 arrangement are used to detect the position of the ramp 12 and the direction of movement of the ramp 12, respectively, other arrangements for detecting the position of the ramp 12 and the direction of movement of the ramp 12 may be utilized. For example, encoders (absolute or relative) or other suitable sensors may be utilized to detect the position and direction of movement of the ramp 12 and solid-state switching components may be utilized to place the motor 24 in the shunted mode or non-shunted mode. Encoders may be used to detect movement of the assembly 10, such as the drive shaft 22 and ramp 12, to determine the position and direction of movement of the ramp 12.

While several embodiments of a ramp assembly having a regenerative braking system were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A ramp assembly comprising:
a ramp movable between a deployed position, a stowed position, and an intermediate position;
a drive mechanism comprising a motor configured to move the ramp between the deployed position and the stowed position, the motor having a shunted mode and a non-shunted mode;
a first detecting arrangement configured to detect a position of the ramp; and
a second detecting arrangement configured to detect a direction of movement of the ramp, wherein the motor is placed in one of the shunted mode and the non-shunted mode based on the position and the direction of movement of the ramp, wherein the motor generates torque opposite to the direction of movement of the ramp when in the shunted mode.

2. The ramp assembly of claim 1, wherein the motor is in the shunted mode when the ramp is moving from the intermediate position to the deployed position and when the ramp is moving from the intermediate position to the stowed position to control the rate of descent of the ramp.

3. The ramp assembly of claim 2, wherein the motor is in the non-shunted mode when the ramp is moving from the deployed position to the intermediate position and when the ramp is moving from the stowed position to the intermediate position.

4. The ramp assembly of claim 1, wherein the drive mechanism further comprises a drive shaft operatively connected to the motor and a drive member operatively connected to the drive shaft.

5. The ramp assembly of claim 4, wherein a cam is secured to the drive member, the first detecting arrangement is configured to detect the cam when the ramp has a predetermined position to determine the position of the ramp.

6. The ramp assembly of claim 5, wherein a direction member is secured to the drive shaft, the second detecting arrangement configured to engage the direction member when the ramp is moving in a predetermined direction to detect the direction of movement of the ramp.

7. The ramp assembly of claim 6, wherein a portion of the direction member is positioned between at least one bumper, the direction member is configured to rotate with the drive shaft and slip relative to the drive shaft when the direction member is engaged with the at least one bumper.

8. The ramp assembly of claim 6, wherein the first and second detecting arrangements are switches.

9. The ramp assembly of claim 1, wherein the first and second detecting arrangements are switches.

10. The ramp assembly of claim 4, wherein the drive mechanism further comprises a first sprocket and a second sprocket, the first sprocket is spaced from the second sprocket, the drive member is positioned circumferentially around the first and second sprockets, the drive shaft is secured to the second sprocket.

11. The ramp assembly of claim 10, wherein the drive member comprises a flexible member forming a closed loop.

12. The ramp assembly of claim 1, wherein the first and second detecting arrangements are operatively connected with the motor to define a circuit.

13. The ramp assembly of claim 12, wherein the first and second detecting arrangements each have an open position and a closed position based on the position of the ramp and the direction of the movement of the ramp, the circuit is configured to be closed when the first and second detecting arrangements are in the closed position to place the motor in the shunted mode.

14. The ramp assembly of claim 8, wherein the first and second detecting arrangements are operatively connected with the motor to define a circuit, and wherein the first and second detecting arrangements each have an open position and a closed position based on the position of the ramp and the direction of the movement of the ramp, the circuit is configured to be closed when the first and second detecting arrangements are in the closed position to place the motor in the shunted mode.

15. The ramp assembly of claim 13, wherein the first and second detecting arrangements are each in the closed position when the ramp is moving from the intermediate position to the deployed position and when the ramp is moving from the intermediate position to the stowed position to control the rate of descent of the ramp.

16. The ramp assembly of claim 14, wherein the first and second detecting arrangements are each in the closed position when the ramp is moving from the intermediate position to the deployed position and when the ramp is moving from the intermediate position to the stowed position to control the rate of descent of the ramp.

17. A method of controlling a ramp assembly having a ramp and a drive mechanism having a motor, the ramp having a deployed position, a stowed position, and an intermediate position, the method comprising:
  shunting the motor when the ramp is rotating from the intermediate position to the deployed position and when the ramp is rotating from the intermediate position to the stowed position, wherein the shunting of the motor generates torque opposite to the direction of movement of the ramp and controls a rate of descent of the ramp,
  wherein the motor is shunted by selectively opening or closing a circuit using a first detecting arrangement configured to detect a position of the ramp and a second detecting arrangement configured to detect a direction of movement of the ramp.

18. The method of claim 17, further comprising:
  placing the motor in a non-shunted mode when the ramp is moving from the deployed position to the intermediate position and when the ramp is moving from the stowed position to the intermediate position.

* * * * *